United States Patent
Arora (10) Patent No.: US 7,937,257 B2
(45) Date of Patent: May 3, 2011

(54) ESTIMATING PERFORMANCE OF APPLICATION BASED ON AUTOMATIC RESIZING OF SHARED MEMORY FOR MESSAGING

(75) Inventor: Nimar S. Arora, Union City, CA (US)

(73) Assignee: Oracle International Corporation, Redwood Shores, CA (US)

(*) Notice: Subject to any disclaimer, the term of this patent is extended or adjusted under 35 U.S.C. 154(b) by 846 days.

(21) Appl. No.: 11/247,976

(22) Filed: Oct. 10, 2005

(65) Prior Publication Data

US 2007/0118600 A1    May 24, 2007

(51) Int. Cl.
  G06F 9/44     (2006.01)
  G06F 9/45     (2006.01)
  G06F 13/00    (2006.01)
  G06F 9/50     (2006.01)

(52) U.S. Cl. ............... 703/20; 703/21; 703/22; 711/170; 718/104

(58) Field of Classification Search ............ 703/20, 703/21, 22; 711/170; 718/104
  See application file for complete search history.

(56) References Cited

U.S. PATENT DOCUMENTS

| | | | | |
|---|---|---|---|---|
| 4,603,382 A * | 7/1986 | Cole et al. | ............ | 710/56 |
| 5,072,444 A * | 12/1991 | Breeden et al. | ............ | 370/235 |
| 5,353,430 A * | 10/1994 | Lautzenheiser | ............ | 711/117 |
| 5,394,531 A * | 2/1995 | Smith | ............ | 711/136 |
| 5,627,994 A * | 5/1997 | Levy et al. | ............ | 711/150 |
| 5,651,136 A * | 7/1997 | Denton et al. | ............ | 711/171 |
| 5,757,771 A * | 5/1998 | Li et al. | ............ | 370/235 |
| 5,778,411 A * | 7/1998 | DeMoss et al. | ............ | 711/4 |
| 6,061,763 A * | 5/2000 | Rubin et al. | ............ | 711/129 |
| 6,070,202 A * | 5/2000 | Minkoff et al. | ............ | 711/171 |
| 6,105,111 A * | 8/2000 | Hammarlund et al. | ............ | 711/136 |
| 6,219,772 B1 * | 4/2001 | Gadangi et al. | ............ | 711/170 |
| 6,453,403 B1 * | 9/2002 | Czajkowski | ............ | 711/170 |
| 6,952,664 B1 * | 10/2005 | Lahiri et al. | ............ | 703/14 |
| 7,783,852 B2 * | 8/2010 | Lahiri et al. | ............ | 711/170 |
| 2004/0034640 A1 * | 2/2004 | Jain et al. | ............ | 707/10 |
| 2004/0034664 A1 * | 2/2004 | Jain et al. | ............ | 707/104.1 |
| 2004/0111514 A1 * | 6/2004 | Chase et al. | ............ | 709/226 |
| 2005/0114621 A1 * | 5/2005 | Lahiri et al. | ............ | 711/170 |
| 2006/0149787 A1 * | 7/2006 | Surlaker et al. | ............ | 707/200 |
| 2010/0082884 A1 * | 4/2010 | Chen et al. | ............ | 711/156 |

OTHER PUBLICATIONS

Method for Adding and Removing Elements From Aged Priority Queues; NB9008430; IBM Technical Disclosure Bulletin, Aug. 1990, US; Aug. 1, 1990 p. 1-8.*

(Continued)

*Primary Examiner* — Kamini S Shah
*Assistant Examiner* — Akash Saxena
(74) *Attorney, Agent, or Firm* — Vista IP Law Group, LLP (57) ABSTRACT

Methods and systems for estimating the hypothetical performance of a messaging application are disclosed. A number of pool sizes may be identified, each pool size being a potential size for the memory allocated to the messaging application. An online simulation is running during the execution of the messaging application. The online simulation tracks the requests made by the messaging application and predicts the operation of the messaging application for each pool size. The data predicted includes the number of spill and unspill operations that read and write to disk. In addition, a method for calculating the age of the oldest message in a memory pool is disclosed. The age is used in determining the number of spill and unspill operations.

32 Claims, 7 Drawing Sheets

OTHER PUBLICATIONS

Thread Scheduling for Multiprogrammed Multiprocessors; Nimar S. Arora Robert D. Blumofe C. Greg Plaxton; ACM 1998 p. 119-129.*

Register Window Analysis in ASIPs; power point presentation; VishalP. Bhatt; May 12, 2001.*

Exploring the number of register windows in ASIP synthesisBhatt, V.P.; Balakrishnan, M.; Kumar, A.; Design Automation Conference, 2002. Proceedings of ASP-DAC 2002. 7th Asia and South Pacific and the 15th International Conference on VLSI Design. Proceedings. Jan. 7-11, 2002 pp. 233-238.*

Oracle® Streams Replication Administrator's Guide 10g Release 1 (10.1) Part No. B10728-01 Dec. 2003 p. 1-364.*

M. Accetta. R. Baron, W. Bolosky, D. Golub, R. Rashib, A. Tevanian, and M. Young. Mach: A new kernel foundation for UNIX development. In Proceedings of the Summer 1986 USENIX Conference, pp. 93-112, Jul. 1986.

Guy E. Blelloch, Phillip B. Gibbons, and Yossi Matias. Provably efficient scheduling for languages with fine-grained parallelism. In Proceeding of the 7th Annual ACM Symposium On Parallel Algorithms and Architectures, pp. 1-12, Santa Barbara, California, Jul. 1995.

Guy E. Blelloch, Phillip B. Gibbons, Yossi Matias, and Girija J. Narlikar. Space-efficient scheduling of parallelism with synchronization variables. In Proceedings of the 9th Annual ACM Symposium on Parallel Algorithms and Architectures, pp. 12-23, Newport, Rhode Island, Jun. 1997.

Robert D. Blumofe, Matteo Frigo, Christopher F. Joerg, Charles E. Leiserson, and Keith H. Randall. An analysis of dag-consistent distributed shared-memory algorithms. In Proceedings of the 8th Annual ACM Symposium on Parallel Algorithms and Architectures, pp. 297-308, Padua, Italy, Jun. 1996.

Robert D. Blumofe, Christopher F. Joerg, Bradley C. Kuszmaul, Charles E. Leiserson, Keith H. Randall, and Yuli Zhou. Cilk: An efficient multithreaded runtime system. Journal of Parallel and Distributed Computing, 37 (1):55-69, Aug. 1996.

Robert D. Blumofe and Charles E. Leiserson. Scheduling multithreaded computations by work stealing. In Proceedings of the 35th Annual Symposium on Foundations of Computer Science (FOCS), pp. 356-368, Santa Fe, New Mexico, Nov. 1994.

Robert D. Blumofe and Dionisios Papadopoulos. The performance of work stealing in multiprogrammed environments (extended abstract). In Proceedings of the 1998 ACM Sigmetrics International Conference on Measurement and Modeling of Computer Systems, Poster Session, Madison, Wisconsin, Jun. 1998.

Richard P. Brent. The parallel evaluation of general arithmetic expressions. Journal of the ACM, 21(2):201-206, Apr. 1974.

Mark Crovella, Prakash DAS, Czarek Dubniki, Thomas LeBlanc, and Evangelos Markatos. Multiprogramming on multiprocessors. In Proceedings of the Third IEEE Symposium on Parallel and Distributed Processing, Dec. 1991.

Andrea C. Dusseau, Remzi H. Arpaci, and David E. Culler. Effective distributed scheduling of parallel workloads. In Proceedings of the ACM Sigmetrics International Conference on Measurement and Modeling of Computer Systems, pp. 25-36, Philadelphia, Pennsylvania, May 1996.

Raphael Finkel and Udi Manber. DIB—A distributed implementation of backtracking—ACM Transactions on Programming Languages and Systems, 9(2):235-256, Apr. 1987.

Vincent W. Freeh, David K. Lowenthal, and Gregory R. Andrews. Distributed Filaments: Efficient fine-grain parallelism on a cluster of workstations. In Proceedings of the First Symposium on Operating Systems Design and Implementation, pp. 201-213, Monterey, California, Nov. 1994.

Matteo Frigo, Charles E. Leiserson, and Keith H. Raandall. The implementation of the Cilk-5 multithreaded language. In Proceedings of the1998 ACM Sigplan Conference on Programming Language Design and Implementation (PLDI), Montreal, Canada, Jun. 1998.

Seth Copen Goldstein, Klaus Erik Schauser, and David E. Culler. Lazy threads: Implementing a fast parallel call, Journal of Parallel and Distributed Computing, 37(1):5-20, Aug. 1996.

Anoop Gupta, Andrew Tucker, and Shigeru Urushibara. The impact of operating system scheduling policies and synchronization methods on the performance of parallel applications. In Proceedings of the 1991 ACM Sigmetrics Conference on Measurement and Modeling of Computer Systems, May 1991.

Robert H. Halstead, Jr. Implementation of Multilisp: Lisp on a multiprocessor. In Conference Record of the 1984 ACM Symposium on Lisp and Functional Programming, pp. 9-17, Austin, Texas, Aug. 1984.

M. Herlihy and J. Wing. Axioms for concurrent objects. In Proceedings of the 14th ACM Symposium on Principles of Programming Languages, pp. 13-26, Jan. 1987.

Maurice Herlihy. A methodology for implementing highly concurrent data structures. In Proceedings of the Second ACM Sigplan Symposium on Principles and Practice of Parallel Programming (PPoPP), pp. 197-206, Seattle, Washington, Mar. 1990.

Maurice Herlihy. Wait-free synchronization. ACM Transactions on Programming Languages and Systems, 11(1): 124-149, Jan. 1991.

M. Frans Kaashoek, Dawson R. Engler, Gregory R. Ganger, Hector M. Brice no, Russell Hunt, David Mazieres, Thomas Pinkney, Robert Grimm, John Jannoutti, and Kenneth MacKenzie. Application performance and flexibility on exokernel systems. In Proceedings of the Sixteenth ACM Symposium on Operating Systems Principles, Saint Malo, France, Oct. 1997.

Charles E. Leiserson, Zahi S. Abuhamdeh, David C. Douglas, Carl R. Feynman, Mahesh N. Ganmukhi, Jeffrey V. Hill, W. Daniel Hillis, Bradley C. Kuszmaul, Margaret A. St. Pierre, David S. Wells, Monica C. Wong, Shaw-Wen Yang, and Robert Zak. The network architecture of the Connection Machine CM-5. In Proceedings of the Fourth Annual ACM Symposium on Parallel Algorithms and Architectures, pp. 272-285, San Diego, California, Jun. 1992.

Mark Moir. Practical implementations of non-blocking synchronization primitives. In Proceedings of the 16th ACM Symposium on Principles of Distributed Computing, Santa Barbara, California, Aug. 1997.

John K. Ousterhout. Scheduling techniques for concurrent systems. In Proceedings of the 3rd International Conference on Distributed Computing Systems, May 1982.

Andrew Tucker and Anoop Gupta. Process control and scheduling issues for multiprogrammed shared-memory multiprocessors. In Proceedings of the Twelfth ACM Symposium on Operating Systems Principles (SOSP), pp. 159-166, Litchfield Park, Arizona, Dec. 1989.

* cited by examiner

Fig. 1

| Pool Size | Spill Count | Unspill Count | Spill Cost | Unspill Cost | Total Cost |
|---|---|---|---|---|---|
| 60 MB | 410 | 412 | 3 min 8 sec | 3 min 8 sec | 6 min 26 sec |
| 70 MB | 402 | 397 | 3 min 2 sec | 2 min 57 sec | 5 min 59 sec |
| 80 MB | 130 | 132 | 48 sec | 51 sec | 1 min 39 sec |
| 90 MB | 70 | 62 | 42 sec | 36 sec | 1 min 18 sec |
| 100 MB | 14 | 14 | 8 sec | 7 sec | 15 sec |
| 110 MB | 2 | 8 | 1 sec | 3 sec | 4 sec |
| 120 MB | 0 | 2 | 0 | 1 sec | 1 sec |
| 130 MB | 0 | 0 | 0 | 0 | 0 |
| 140 MB | 0 | 0 | 0 | 0 | 0 |

ESTIMATING PERFORMANCE OF APPLICATION BASED ON AUTOMATIC RESIZING OF SHARED MEMORY FOR MESSAGING

FIELD

Embodiments of the invention relate to computer systems, and more particularly to simulation of memory allocation.

BACKGROUND OF THE INVENTION

Queuing applications may use messaging features to allow a producer of information to communicate with a consumer of information. In such queuing applications, a producer of information may generate a message and place it into a message queue. A consumer of information may access the message by performing a browse operation. When the message is no longer useful, a dequeue operation may be used to remove it from the queue.

A user may specify an amount of memory to be used by the queuing application. Messages may be stored in this dedicated memory whenever possible. However, memory in such systems may be limited. If there is not enough memory for the queuing operation, some messages may be stored on disk rather than in memory. In many systems, when the memory is full and a new message must be enqueued, the oldest message in memory is written to disk and the new message is stored in memory.

Storing a message onto disk may be referred to as "spilling" the message onto disk, and browsing or dequeuing a message on disk may be referred to as "unspilling" the message.

Reading and writing to memory may be time-consuming and costly. For this reason, it is advantageous to reduce spill and unspill count, or the number of spills and unspills. Reducing the spill and unspill count may be achieved by allocating more memory to the queuing application. However, this may negatively affect the performance of other applications in the system.

Users may therefore weigh competing factors in determining how much memory to allocate to the messaging application and to other applications in the system. Often, users do not have enough information to determine an appropriate amount of memory to allocate for the messaging application.

What is needed, therefore, is a solution that overcomes these and other shortcomings of the prior art.

SUMMARY OF THE INVENTION

In one implementation, the invention includes methods and systems for estimating the hypothetical performance of a messaging application. A number of pool sizes may be identified, each pool size being a potential size for the memory allocated to the messaging application. An online simulation may be running during the execution of the messaging application. The online simulation tracks the requests made by the messaging application and predicts the operation of the messaging application for each pool size. The data predicted includes the number of spill and unspill operations that read and write to disk. In addition, a method for calculating the age of the oldest message in a memory pool is disclosed. The age is used in determining the number of spill and unspill operations.

BRIEF DESCRIPTION OF THE DRAWINGS

The invention is illustrated by way of example and not limitation in the figures of the accompanying drawings, in which like references indicate similar elements and in which.

DETAILED DESCRIPTION

Methods and apparatuses for resizing shared memory are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

Overview

In one implementation, the invention relates to systems and methods for simulating the activity of the messaging application for various memory sizes. Each memory size used in the simulation may be referred to as a "pool." For each pool, data describing the cost of performing spills and unspills may be calculated. The cost of performing spills may be referred to as "spill data" and the cost of performing unspills may be referred to "unspill data." The spill and unspill data may be calculated for a number of pool sizes. The spill and unspill data may then be presented to a user to allow the user to select an appropriate amount of memory for the messaging application. Alternatively, the spill and unspill data may be used to automatically resize the memory used for the messaging application.

In one implementation, calculations may be performed in an online fashion. As requests such as enqueue requests, dequeue requests, and browse requests are made, their impact on systems with memories of various sizes is calculated. Performing calculations in such a fashion may allow for data to be presented to a user, and for automatic resizing of memory, while the messaging application is running.

Figure 1:
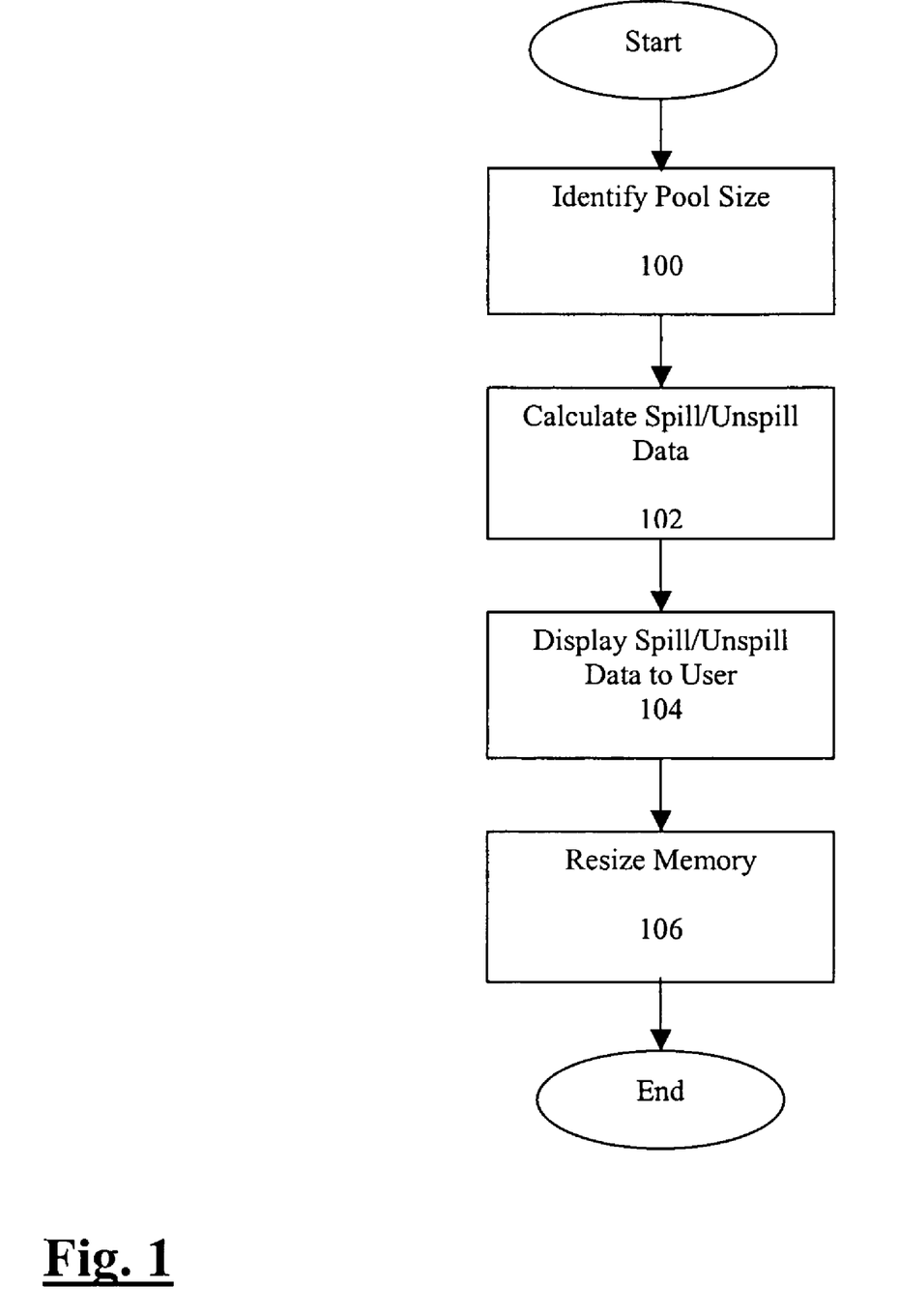
FIG. 1 is a flow chart illustrating a method for calculating spill and unspill data, in accordance with an embodiment of the present invention.

FIG. 1 is a flow chart illustrating a method for resizing the memory of a messaging application. As shown in FIG. 1, the method may begin in step 100, wherein one or more pool sizes may be identified. The pool sizes may be specified by the user, may be specified as fixed pool sizes in the system, or may be calculated by the system. The pool sizes may be calculated by the system, for example, based on the current memory size and/or the system activity. For example, the pool sizes may be set to range from 10% of the current memory size to 200% of the current memory size, in 10% increments. As another example, the pool sizes may be set in 5 MB increments, up to 50 MB above the current memory size and down to 50 MB below the current pool size. Many other pool sizes will occur to those skilled in the art.

In step 102, spill and/or unspill data may be calculated for each pool size. The spill and unspill data may include, for example, the number of spills and unspills; the spill time and unspill time taken up by spill and unspill operations, respectively; and the total time taken up by both spill and unspill operations. Other spill and unspill data may also be calculated.

Figure 2:
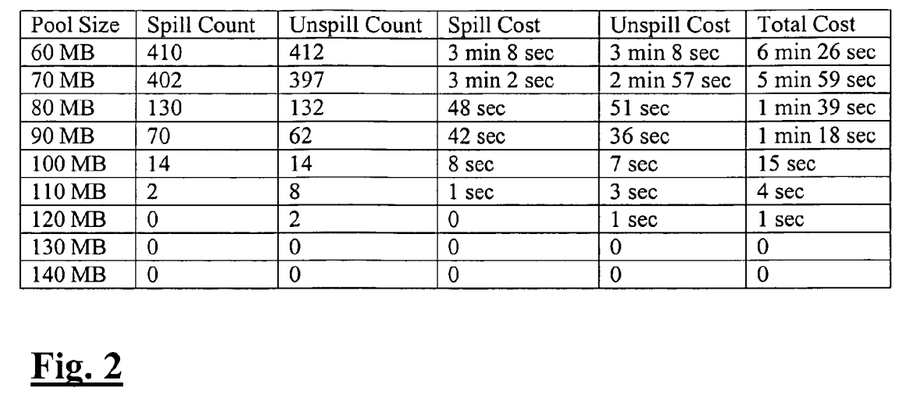
FIG. 2 is a block diagram illustrating an exemplary table of spill and unspill data, in accordance with and embodiment of the present invention.

In step 104, the spill and/or unspill data my optionally be displayed to a user. The spill and/or unspill data may be displayed, for example, via a table, as shown in FIG. 2. Other methods for displaying the spill and/or unspill data will occur to those skilled in the art.

In step 106, the memory for the messaging application may be resized, for example, based on the spill and/or unspill data. In one implementation, a user may resize the memory based on the spill and/or unspill data displayed in step 104. In another implementation, the system may automatically resize the memory.

In one implementation, the system is capable of simulating the behavior of other applications in addition to simulating the behavior of the messaging application. In this case, the system may use a plurality of simulations to allocate shared memory to various applications. For example, a simulation of the messaging application may compute the time spent on spills and unspills for memories of various sizes. Other simulations may compute additional or unnecessary time spent for memories of various sizes. The outputs from these simulations may be used to optimize memory allocation to the applications in the system.

Spill and Unspill Data

FIG. 2 is a block diagram illustrating an exemplary table of spill and unspill data that may be presented to a user. As shown in FIG. 2, the table may include a plurality of rows, each corresponding to a pool size. In each row, spill and/or unspill data may be included. The spill and/or unspill data in a particular row is the result of performing a simulation of the messaging application using the pool size as the available amount of memory. Methods for performing a simulation to obtain spill and unspill data will be discussed further with reference to FIG. 3.

The spill and/or unspill information displayed in each row may include, for example, the spill count, which may be a running total of all the spills that would have occurred for a memory size equal to the pool size, and the unspill count, which may be a running total of all the unspills that would have occurred for a memory size equal to the pool size. The spill and/or unspill data may further include the spill cost, which may be represented as the amount of time spent performing spill operations, an unspill cost, which may be represented as the amount of time spent performing unspill operations, and a total cost, which may be the sum of the spill cost and unspill cost. The spill cost may be calculated, for example, by multiplying the spill count by the average time to write to disk. Similarly, the unspill cost may be calculated, for example, by multiplying the unspill count by the average time to read from disk. The average time to write to and read from disk may be statistics that are tracked by the system. For example, the average time to write to and read from disk may be calculated using a weighted running average algorithm.

Because the method for computing spill and unspill data may be performed online, and because the spill and unspill data may be running totals, the spill and unspill data may increase as time goes on. In particular, every time a messaging request such as an enqueue request, dequeue request, or browse request is made, it will be determined whether the messaging request will affect the spill or unspill count for each pool. If so, the spill or unspill count for the affected pool may be incremented, and the spill cost, unspill cost, and/or total cost may be adjusted accordingly.

In this implementation, if a user wishes to obtain the spill and unspill data for a particular period, two snapshots of the table of FIG. 2 may be taken, and the snapshots compared. For example, a user could take a snapshot of the table at 5 am, and another at 6 am, and compare the two snapshots to obtain the activity for the time period between 5 and 6 am.

In another implementation, the spill and/or unspill data may not be implemented as running totals, but may rather be implemented as rates. For example, the spill count could be represented as the number of spills per minute or per hour, and the spill cost could be represented as seconds per minute or seconds per hour. Other implementations will occur to those skilled in the art. If the spill and/or unspill data are implemented as rates, the spill and/or unspill data may fluctuate up and down with the activity of the system. In yet another implementation, the spill and/or unspill data may be represented as some combination of running totals and rates.

Because spill and unspill activity decreases as memory increases, the spill and/or unspill data will decrease for larger pool sizes. The user may use the spill/and or unspill data in the table to resize the memory, for example, based on how much memory is available and what spill and/or unspill costs are acceptable. Alternatively or in addition, the memory may be automatically resized according to the information in the table.

Figure 3:
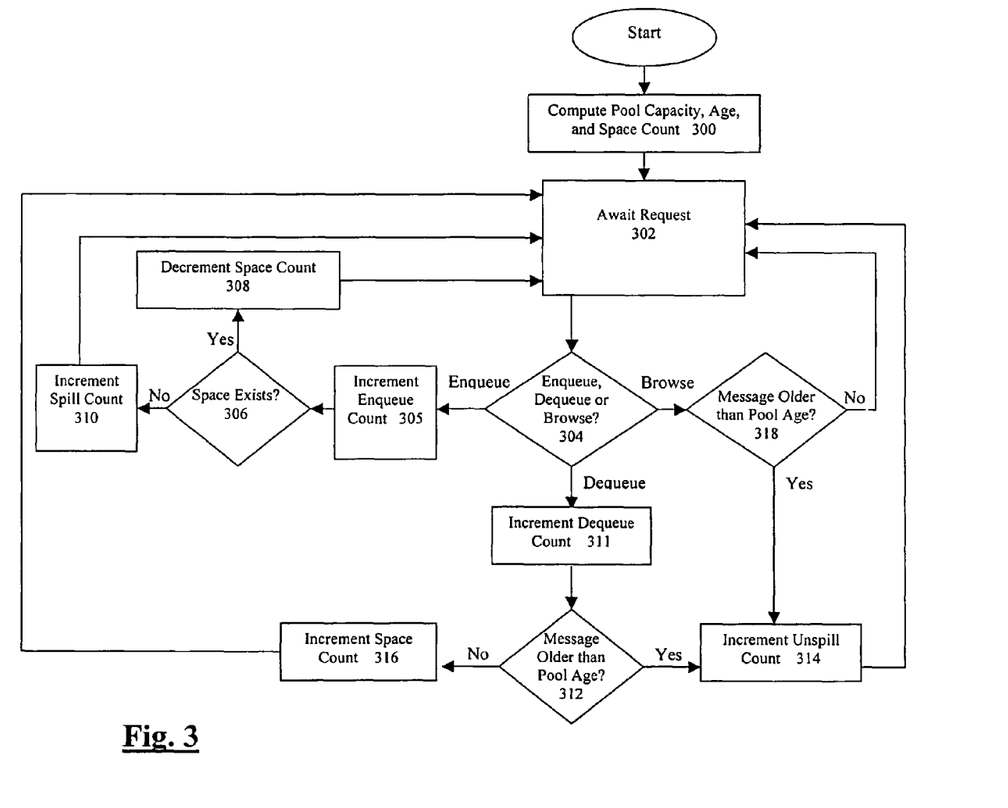
FIG. 3 is flow chart illustrating a method for calculating spill and unspill data, in accordance with an embodiment of the present invention.

FIG. 3 is a method for generating spill and unspill data for a particular pool size. The inputs to the method of FIG. 3 may be, for example, the pool size, the average message size and the latency of each browse or dequeue operation. The latency of a browse or dequeue operation may be the time that elapsed between the message being enqueued and the message being browsed or dequeued. The latency of each browse or dequeue operation may be included in the body of the browse or dequeue operation, or may be otherwise obtained.

The outputs to the method of FIG. 3 may be, for example, a spill count and an unspill count. The spill and unspill count may be used to generate a table of spill and unspill data, as shown in FIG. 2.

The method of FIG. 3 may be used to generate a spill and unspill count for a particular pool size. In order to compute spill and unspill counts for multiple pool sizes, a plurality of instances of the method of FIG. 3 may be run in tandem. Each instance may correspond to one particular pool size.

The method of FIG. 3 may depend on the average message size. However, the size of messages in the system may fluctuate. In order to obtain accurate results, the average message size may therefore be recalculated at fixed intervals, such as, for example, every 5 seconds. The average message size may be calculated, for example, using an algorithm for a weighted running average. In the case where the average message size is recalculated at fixed intervals, the method of FIG. 3 may be restarted at regular intervals. For example, the average message size may be calculated, and the method of FIG. 3 may begin. As message requests are made, the method of FIG. 3 may increment the spill count and/or unspill count appropriately. The method will continue until the end of the fixed period. At the end of the fixed period, the average message size may be recalculated, and the method of FIG. 3 may begin again, using the updated average message size. In this case, the spill and unspill counts may not be reset when the method of FIG. 3 is restarted. This may ensure that the spill and unspill counts are maintained as running totals.

The method of FIG. 3 may begin in step 300, wherein the capacity, age, and space count for the pool may be computed. The capacity of the pool is an indication of how many messages may be stored in a memory with size equal to the pool size. The capacity may be computed, for example, by dividing the pool size by the average message size. The space count of the pool is an indication of the number of messages that can be enqueued into the available space. The space count may be computed, for example, using an "outstanding count." The outstanding count is a count of the number of messages in the queue. The outstanding count may be computed at regular intervals, such as, for example, every 5 seconds. The computation of the outstanding count will be discussed further with reference to FIG. 4. The space count may be calculated, for example, by subtracting the outstanding count from the capacity of the pool.

The age of the pool is an indication of the oldest message that is stored in memory. For example, if the age of the pool is 11 seconds, all messages up to 11 seconds old will be stored in the pool, and all messages older than 11 seconds will be stored on disk. Systems and methods for calculating the age of the pool will be described further with reference to FIGS. 4A-B.

The method may continue in step 302, wherein a request to the queueing application is awaited. When a request, such as an enqueue request, a dequeue request, or a browse request, is made to the queueing application, the method continues in step 304.

In step 304, it may be determined whether the request is an enqueue request, a dequeue request, or a browse request. If the request is a dequeue request or a browse request, there will be a latency associated with the request.

If the request is an enqueue request, the method may continue in step 305, wherein an enqueue count may be incremented. The enqueue count may be used, for example, in conjunction with a bucket system to calculate the age of one or more pools. Incrementing an enqueue count may include, for example, incrementing the enqueue count for a bucket corresponding to the current time period. The enqueue count and bucket system will be discussed further with reference to FIGS. 4A-C.

In step 306, it may be determined if there is space available. Determining whether there is space available may include, for example, determining whether the space count is greater than zero. If there is space available, the method may continue in step 308, wherein the space count may be decremented. If there is no space available, the method may continue in step 310, wherein the spill count may be incremented. The method may then return to step 302, to await another request.

If the request is a dequeue request, the method may continue in step 311, wherein a dequeue count may be incremented. The dequeue count may be used, for example, in conjunction with a bucket system to calculate the age of one or more pools. Incrementing a dequeue count may include, for example, examining the latency of the dequeue request to and incrementing the dequeue count for a bucket corresponding to the latency of the dequeue request. The dequeue count and bucket system will be discussed further with reference to FIGS. 4A-C.

The method may continue in step 312, wherein it may be determined whether the message is older than the age of the pool. This may be performed, for example, by comparing the dequeue latency to the age of the pool. If the message is older than the age of the pool, the unspill count may be incremented in step 314. If the message is not older than the age of the pool, the space count may be incremented in step 316. The method may return to step 302 to await another request.

If the request is a browse request, the method may continue in step 318, wherein it may be determined whether the message is older than the age of the pool. This may be performed, for example, by comparing the browse latency to the age of the pool. If the message is older than the age of the pool, the unspill count may be incremented in step 314. The method may return to step 302 to await another request.

At periodic intervals, the average message size may be recalculated, and the method of FIG. 3 may be restarted. However, restarting the method of FIG. 3 may not include resetting the variables for the spill count and unspill count. Rather, the variables for the spill count and unspill count may remain unaltered as the method is restarted. This may ensure that accurate running totals are calculated.

Calculating Pool Age

A method for calculating the age of a pool will now be described with reference to FIGS. 4A-C. The age of a pool may be the age of the oldest message stored in the pool. Because the oldest message in a pool is spilled over onto disk when space is needed, the age of a pool provides a method to determine whether a particular message will be found in the pool, or whether it will be found on disk. Messages up to the age of the pool will be stored in the pool, while messages older than the age of the pool will have been spilled over onto disk.

Because the age of the pool changes with system activity, the age of the pool may be recalculated at regular intervals, such as every 5 seconds.

Figure 4A:
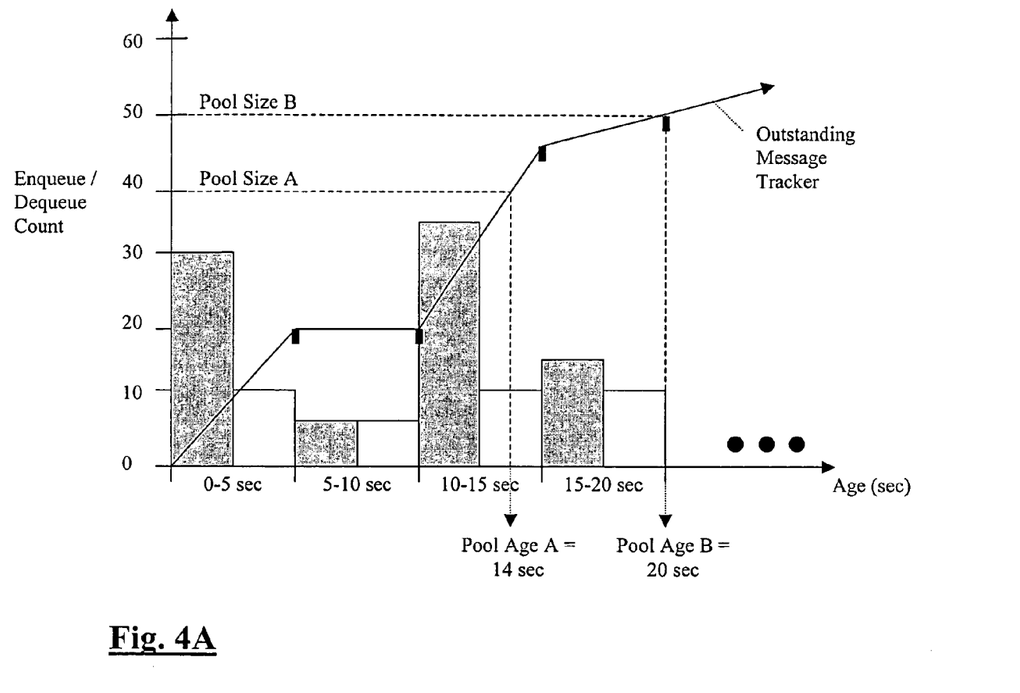
FIGS. 4A-B are graphs illustrating a method for calculating the age of a pool, in accordance with an embodiment of the present invention.

As shown in FIG. 4A, a chart may be maintained to aid in calculating the age of one or more pool. The chart may contain a number of buckets, which may be implemented as regular intervals of time, such as, for example, 5 seconds. As shown in FIG. 4A, a first bucket may contain data for requests in the current interval (age 0-5 sec.), a second bucket may contain data for requests in the previous interval (age 5-10 sec.), etc. Some number of buckets may be stored to hold an appropriate amount of data, for example, 10 minutes worth of data. At regular intervals, for example, every 5 seconds, data from each bucket may be shifted to the right so that new data may be entered into the left-most bucket. Furthermore, the space count and age of each pool may be recalculated after each shift, as discussed with reference to FIG. 3. In addition, during a shift, the enqueue/dequeue count data may be smoothed out to fix any distortions caused by approximation.

For each bucket, an enqueue count and a dequeue count may be maintained. The enqueue count, shown as a shaded bar in each bucket, may represent the number of messages that were enqueued in the time interval corresponding to the bucket. Thus, the enqueue count may be incremented for the left-most bucket as enqueue requests are made. However, once the time interval has expired and data for the bucket has been shifted to the right, that enqueue count may not be incremented any further. Additional enqueue requests will increment the enqueue count in the left-most bucket, while the enqueue count in the other buckets will remain unchanged.

For example, as shown in FIG. 4A, during a time interval of 0-5 seconds, the enqueue count for the left-most bucket may be increased from zero to 30, as 30 enqueue requests are made. At the end of the time interval, data from the left-most bucket will be shifted to the right, as shown in FIG. 4B. As shown in FIG. 4B, the enqueue count will remain at 30. At the end of each subsequent time interval, the data will again be shifted to the right, and the enqueue counts will remain the same.

In contrast, the dequeue counts may not remain constant as data is shifted to the right. As dequeue requests for older messages are made, the dequeue count for the associated buckets may increase. By examining the dequeue latency, the appropriate bucket may be identified. For example, if a dequeue request is made with a dequeue latency of 12 seconds, the dequeue count for the bucket 10-15 seconds will be incremented.

Thus, the enqueue count for a particular bucket shows the number of messages that have been enqueued, and the dequeue count for that bucket shows how many of those messages have already been dequeued. By subtracting the dequeue count from the enqueue count, it can then be determined how many enqueued messages remain in the system for that particular time period. This is known as the outstanding message count for a particular time period.

By cumulatively summing the outstanding message count, an outstanding message tracker may be created. The outstanding message tracker may illustrate, for example, how many messages for a particular age range remain in the system. As shown in FIG. 4A, at an age of 5 seconds, the outstanding message tracker has a value of 20, indicating that 20 messages younger than 5 seconds remain in the queue. At an age of 10 seconds, the outstanding message tracker continues to have the value of 20, because all enqueued messages for the bucket 5-10 seconds have been dequeued. At an age of 15 seconds, the outstanding message tracker has a value of 45, indicating that 45 messages younger than 15 seconds remain in the queue.

By determining the age at which the outstanding message tracker has a value equivalent to the pool size, the age of the pool can be determined. For example, as shown in FIG. 4A, the outstanding message tracker reaches a value of 40 at an age of 14 seconds. Thus, the age of a pool with a capacity of 40 messages would be 14 seconds. Again looking at FIG. 4A, the outstanding message tracker reaches a value of 50 at an age of 20 seconds. Thus, the age of a pool with a capacity of 50 messages would be 20 seconds.

Figure 4B:
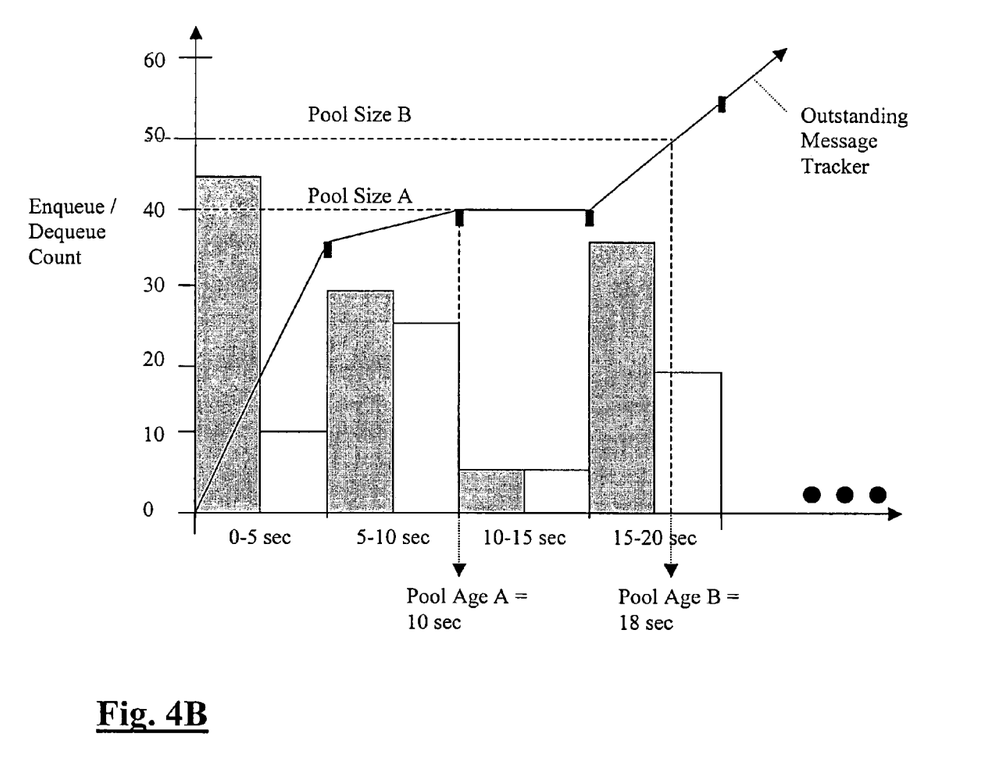

FIG. 4B illustrates the chart of FIG. 4A as it might appear after one time interval has passed. As shown in FIG. 4B, data has been shifted to the right, maintaining the values of the enqueue counts, and incrementing the values of the dequeue counts when appropriate. Furthermore, new data has been added to the left-most bucket. Thus, the outstanding count tracker has been altered to reflect the new data, and the age for each pool is similarly altered. As shown in FIG. 4B, for a pool with a capacity of 40 messages, the new age is 10 seconds, and for a pool with a capacity of 50 messages, the new age is 18 seconds.

The graphs illustrated in FIGS. 4A-B need not be graphically displayed. Rather, the information conveyed in the graphs could be stored in memory, or a logical equivalent of the graphs could otherwise be stored. Furthermore, many modifications to the graphs shown in FIGS. 4A-B will occur to those skilled in the art. For example, the y-axis need not convey the number of messages, but may rather convey the amount of memory used by each message. Similarly, the enqueue and dequeue counts could be replaced by the amount of memory used, either based on the average message size, or based on the actual size of each message. Furthermore, while the graphs have been generally described in terms of dividing age into buckets, the age could be continuously represented, and each enqueue or dequeue correspond to a particular age rather than being placed in a bucket. Other modifications will occur to those skilled in the art.

Figure 4C:
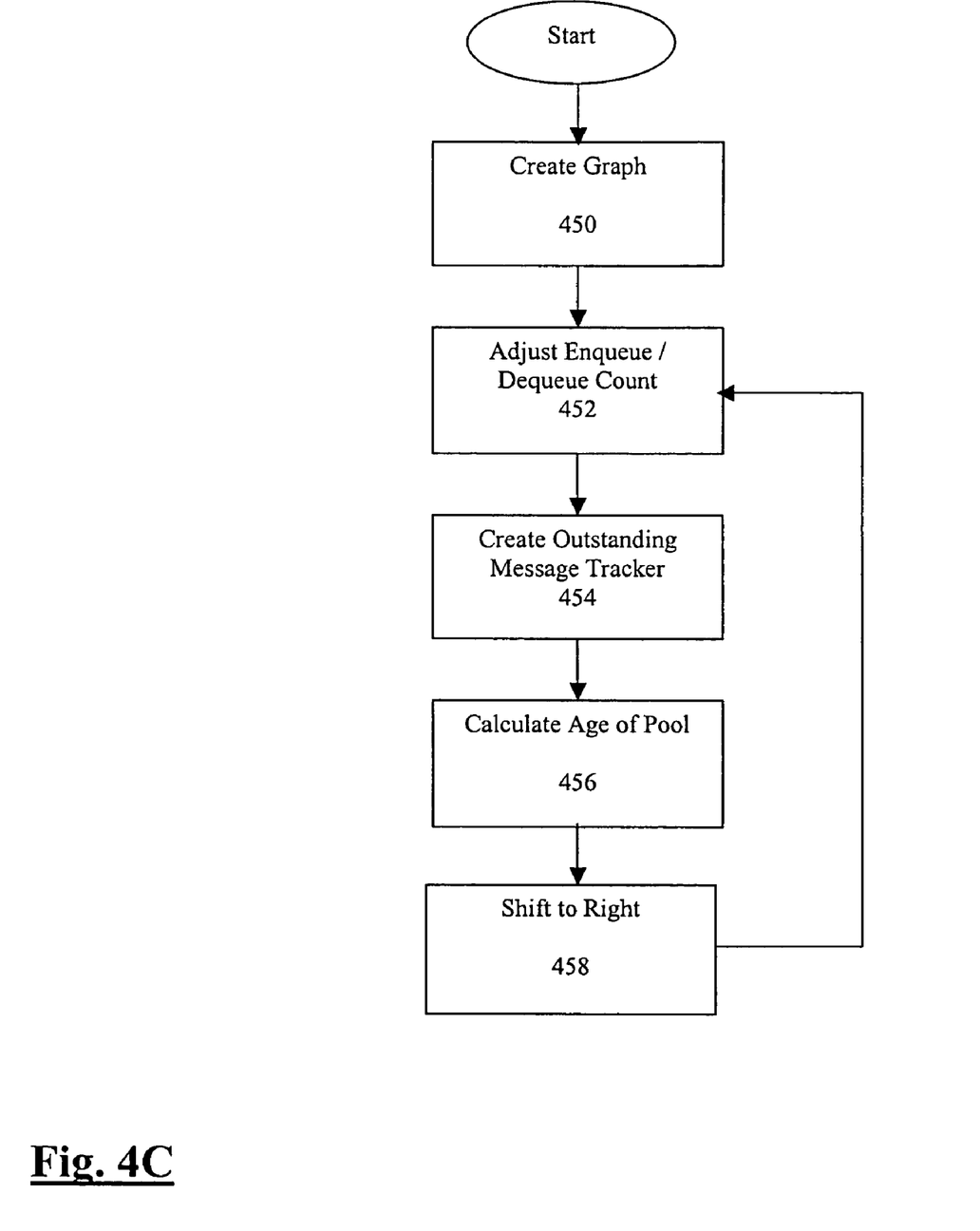
FIG. 4C is a flow chart illustrating a method for calculating the age of a pool, in accordance with an embodiment of the present invention.

FIG. 4C is a flow chart illustrating a method for calculating the age of a pool. The method may begin in step 400, wherein a graph may be created. Initially, the graph may not contain any data. The method may continue in step 402, wherein the enqueue and dequeue count of the graph may be adjusted. This may include, for example, incrementing the enqueue count for a left-most bucket in response to enqueue requests, and incrementing the dequeue count of the appropriate bucket in response to dequeue requests. The appropriate bucket may be determined, for example, by examining the latency of the dequeue request.

The method may continue in step 454, wherein an outstanding message tracker may be created, for example, by calculating the outstanding message count at regular age intervals. The outstanding message count for an age may be, for example, the number of messages younger than the age.

The method may continue in step 456, wherein the age of one or more pools may be calculated. Calculating the age of a pool may include, for example, examining the outstanding message tracker to determine at what age the outstanding count tracker becomes equal to the size of the pool.

The method may continue in step 458, wherein data from each bucket may be shifted to the right. The method may then return to step 452.

The method illustrated in FIGS. 4A-C may be used to compute the ages for various pool sizes. The age for each pool size may further be used to calculate spill and unspill data. The spill and unspill data may then be used to adjust the memory provided to a queuing application.

System Architecture Overview

Figure 5:
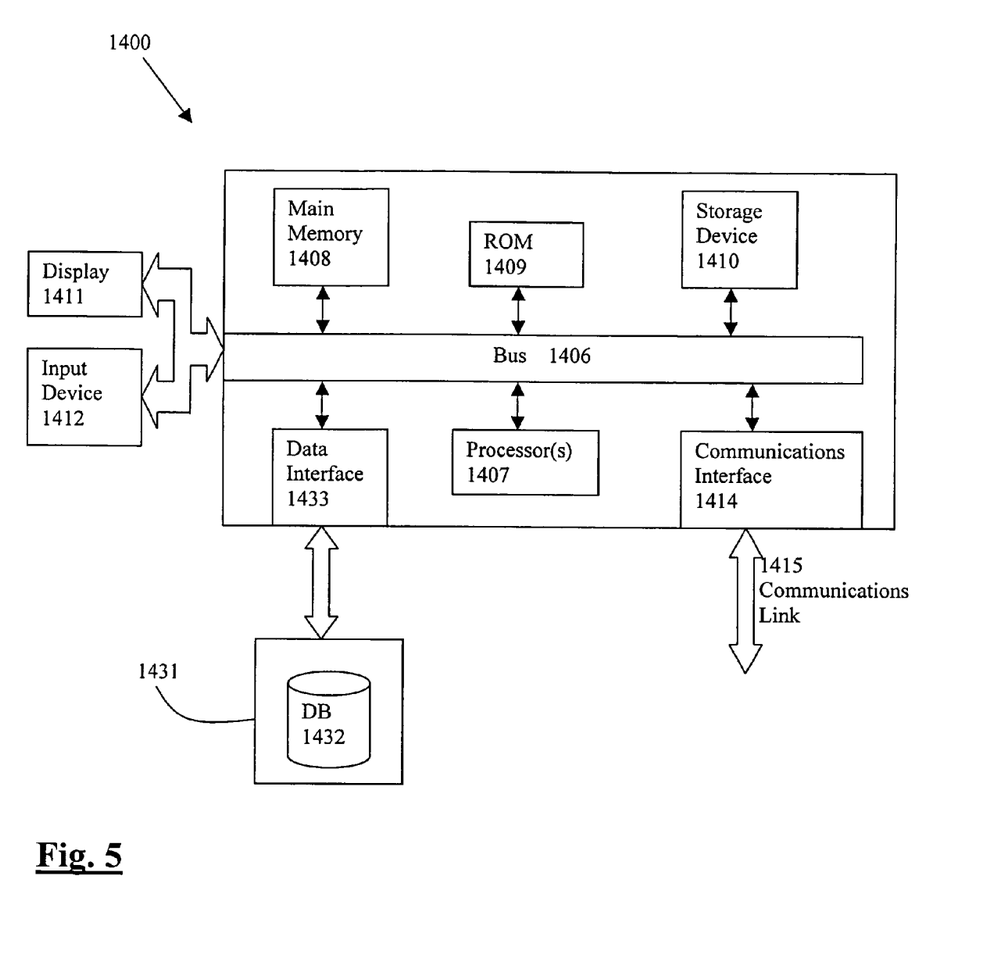
FIG. 5 illustrates a processing system in which embodiments of the invention may be practiced.

The execution of the sequences of instructions required to practice the invention may be performed in embodiments of the invention by a computer system 1400 as shown in FIG. 5. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 5, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile and volatile media. Non-volatile media, i.e., media that can retain information in the absence of power, includes the ROM 1409, CD ROM, magnetic tape, and magnetic discs. Volatile media, i.e., media that cannot retain information in the absence of power, includes the main memory 1408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions.

Furthermore, it is contemplated that multiple processes on one computer or on a computer network could simultaneously use the messaging system. In this cases, systems and methods of the invention may be used to manage the size of the memory allocated to the messaging system. Furthermore, in this case, concurrency control could be implemented in the system to ensure that only one process is able to update the enqueue and dequeue counts, or the spill and unspill counts, at any given point in time. Other modifications for the scenario in which multiple processes use the messaging system will occur to those skilled in the art.

The specification and drawings are, accordingly, to be regarded in an illustrative rather than restrictive sense.

What is claimed is:

1. A computer implemented method for estimating performance of an application, comprising:
   using a processor that is programmed for performing a simulation of behavior of an application during an execution of the application, the act of performing the simulation during the execution of the application comprises:
      monitoring the execution of the application for generating data for performing the simulation of the behavior of the application;
      identifying a number of pool sizes, each of the number of the pool sizes specifying a size of a memory that can be used by the application;
      for the each of the number of the pool sizes, predicting the performance of one or more operations of the application by at least determining information or data about spill and unspill to generate an output to improve memory allocation to the application, wherein
         the act of determining the information or data about the spill and the unspill is repeated for a plurality of requests during the execution of the application for the each of the number of pool sizes, and
         the information or data about the spill comprises a number of one or more spills and the information or data about the unspill comprises a number of one or more unspills that would result from at least some of the plurality of requests as if the application were allocated an amount of memory specified by the each of the number of the pool sizes; and
   using a display apparatus configured for displaying the information or data about the spill or the unspill or using a computer readable storage medium or a computer storage device configured for storing the information or data about the spill or the unspill.

2. The method of claim 1, wherein the application is a messaging application.

3. The method of claim 1, wherein the plurality of requests comprise:
   a request selected from the group consisting of an enqueue request, a dequeue request, and a browse request.

4. The method of claim 1, wherein the act of determining the information or data about the spill comprises:
   incrementing a number of spills in response to an enqueue request, if it is determined that the memory will be full at a time of the enqueue request.

5. The method of claim 1, wherein the act of determining the information or data about the unspill comprises:

incrementing a number of unspills in response to a dequeue or browse request, if it is determined that a message specified by the dequeue or browse request will be stored on disk at a time of the dequeue or browse request.

6. The method of claim 1, further comprising:
displaying the information or data of the spill based on a spill count or the information or data of the unspill based on a unspill count.

7. The method of claim 6, wherein the information or data of the spill comprises one selected from the group consisting of a number of spills, a number of unspills, and a total number of spills arid unspills.

8. The method of claim 6, wherein the information or data of the spill comprises one selected from the group consisting of time spent performing spill operations, time spent performing unspill operations, and total time spent performing spill and unspill operations.

9. The method of claim 6, further comprising:
receiving a selection from a user, the selection indicating a memory size for the application; and
resizing the memory allocated to the application in accordance with the selection.

10. The method of claim 1, further comprising: automatically resizing the memory allocated to the application based at least in part on a number of spills or unspills.

11. A computer implemented method for estimating an age of a memory with a predetermined size, comprising:
using a processor that is configured for determining the age of the memory by at least performing a simulation for behavior of an application during an execution of the application, the act of performing the simulation during the execution of the application comprises:
monitoring the execution of the application for generating data for performing the simulation of the behavior of the application;
generating one or more outstanding message count data points based at least in part on a plurality of requests made by the application during the execution, each of the one or more outstanding message count data points specifying a first age and a message count, the message count being an estimate of a number of messages in a queue that are younger than the first age;
generate generating an output that is used to improve memory allocation of the application;
determining the age of the memory by using at least a first data point of the one or more outstanding message count data points or a latency repeatedly for each of the plurality of requests to find the age corresponding to the number of messages that can be stored in the memory with the predetermined size as if the application were allocated the memory; and
repeating the act of determining the age of the memory by using at least a second request of the plurality of requests; and
using a display apparatus configured for displaying a result of the age, the first age, or the message count or using a computer readable storage device or a computer storage device configured for storing the result.

12. The method of claim 11, wherein the act of generating the one or more outstanding message count data points comprises incrementing the message count specified by a data point in response to an enqueue request.

13. The method of claim 11, wherein the act of generating the one or more outstanding message count data points comprises decrementing the message count specified by a data point in response to a dequeue request.

14. The method of claim 11, wherein the act of generating the one or more outstanding message data points comprises generating a message count by obtaining an enqueue count specifying a number of messages enqueued during a first time period, and subtracting from it a dequeue count specifying a number of those messages that have been dequeued.

15. The method of claim 14, further comprising selecting the first age from within the first time period.

16. The method of claim 11, further comprising:
generating an outstanding message tracker that includes each data point.

17. The method of claim 16, further comprising:
determining a second age at which the outstanding message tracker reaches the predetermined size.

18. The method of claim 16, wherein the method is used to estimate a plurality of ages of a plurality of memories, each with a predetermined size, and wherein the act of performing the simulation for the behavior of the application is performed to find the plurality of ages, each age corresponding to a respective number of messages that can be stored in one of the plurality of memories.

19. A computer program product comprising a tangible computer usable medium having executable code which, when executed by a processor, causes the processor to execute a process for estimating performance of an application, the process comprising:
using the processor that is configured for performing a simulation of behavior of an application during an execution of the application, the act of performing the simulation during the execution of the application comprises:
monitoring the execution of the application for generating data for performing the simulation of the behavior of the application;
identifying a number of pool sizes, each of the number of the pool sizes specifying a size of a memory that can be used by the application;
for the each of the number pool sizes, comprising predicting the performance of one or more operations of the application by at least determining information or data about spill and unspill to generate an output to improve memory allocation to the application, wherein
the act of determining the information or data about the spill and the unspill is repeated for a plurality of requests during the execution of the application for the each of the number of pool sizes, and
the information or data about the spill comprises a number of one or more spills and the information or data about the unspill comprises a number of one or more unspills that would result from the plurality of requests if the application were allocated an amount of memory specified by the each of the number of the pool sizes.

20. The computer program product of claim 19, wherein the process for determining the information or data about the spill comprises:
incrementing a number of spills in response to an enqueue request, if it is determined that the memory will be full at a time of the enqueue request.

21. The computer program product of claim 19, wherein the process of determining the information or data about the unspill comprises:
incrementing a number of unspills in response to a dequeue or browse request, if it is determined that a message specified by the dequeue or browse request will be stored on disk at a time of the dequeue or browse request.

22. A system for estimating performance of an application, comprising:
  a processor that is configured for performing a simulation of behavior of an application during an execution of the application, the act of performing the simulation during the execution of the application comprises:
    monitoring the execution of the application for generating data for performing the simulation of the behavior of the application;
    identifying a number of pool sizes, each of the number of the pool sizes specifying a size of a memory that can be used by the application; and
    for the each of the number of the pool sizes, predicting the performance of one or more operations of the application by at least determining information or data about spill and unspill to generate an output to improve memory allocation to the application, wherein
      the act of determining information or data about the spill and the unspill is repeated for a plurality of requests during the execution of the application for the each of the number of pool sizes, and
      the information or data about spill comprises a number of one or more spills and the information or data about the unspill comprises a number of one or more unspills that would result from at least some of the plurality of requests if the application were allocated an amount of memory specified by the each of the number of pool sizes; and
  a display apparatus configured for displaying the information or data about the spill or the unspill or a storage device or a computer usable storage medium configured for storing the information or data about the spill or the unspill.

23. The computer program product of claim 19, the process further comprising: automatically resizing the memory allocated to the application based at least in part on a number of spills or unspills.

24. The system of claim 22, wherein the processor configured for determining the information or data about the spill is further configured for performing:
  incrementing a number of spills in response to an enqueue request, if it is determined that the memory will be full at a time of the enqueue request.

25. The system of claim 22, wherein the processor configured for determining the information or data about the unspill is further configured for performing:
  incrementing a number of unspills in response to a dequeue or browse request, if it is determined that a message specified by the dequeue or browse request will be stored on disk at a time of the dequeue or browse request.

26. The system of claim 22, the processor configured for performing the simulation of the behavior of the application is further configured for performing: automatically resizing the memory allocated to the application based at least in part on a number of spills or unspills.

27. A computer program product comprising a tangible computer usable storage medium having executable code which, when executed by a processor, causes the processor to execute a process for estimating an age of a memory with a predetermined size, the process comprising:
  using a processor that is configured for determining the age of the memory by at least performing a simulation for behavior of an application during an execution of the application, the act of performing the simulation during the execution of the application comprises:
    monitoring the execution of the application for generating data for performing the simulation of the behavior of the application;
    generating one or more outstanding message count data points based at least in part on a plurality of requests made by the application during the execution, each of the one or more outstanding message count data points specifying a first age and a message count, the message count being an estimate of a number of messages in a queue that are younger than the first age;
    generating an output that is used to improve memory allocation of the application;
    determining the age of the memory by using at least a first data point of the one or more outstanding message count data points or a latency repeatedly for each of the plurality of requests to find the age corresponding to the number of messages that can be stored in the memory with the predetermined size as if the application were allocated the memory; and
    repeating the act of determining the age of the memory by using at least a second request of the plurality of requests.

28. The computer program product of claim 27, the process further comprising:
  generating an outstanding message tracker that includes each data point.

29. The computer program product of claim 28, the process further comprising:
  determining a second age at which the outstanding message tracker reaches the predetermined size.

30. A system for estimating an age of a memory with a predetermined size, the system comprising:
  a processor that is configured for determining the age of the memory by at least performing a simulation for behavior of an application during an execution of the application, the act of performing the simulation during the execution of the application comprises:
    monitoring the execution of the application for generating data for performing the simulation of the behavior of the application;
    generating one or more outstanding message count data points based at least in part on a plurality of requests made by the application during the execution, each of the one or more outstanding message count data points specifying a first age and a message count, the message count being an estimate of a number of messages in a queue that are younger than the first age;
    generating an output that is used to improve memory allocation of the application;
    determining the age of the memory by using at least a first data point of the one or more outstanding message count data points or a latency repeatedly for each of the plurality of requests to find the age corresponding to the number of messages that can be stored in the memory with the predetermined size as if the application were allocated the memory; and
    repeating the act of determining the age of the memory by using at least a second request of the plurality of requests; and
  a display apparatus configured for displaying a result of the age, the first age, or the message count or a storage device or a computer usable storage medium configured for storing the result.

31. The system of claim 30, the processor configured for performing the simulation for behavior of the application is further configured for performing:

generating an outstanding message tracker that includes each data point.

32. The system of claim 31, the processor configured for performing the simulation for behavior of the application is further configured for performing determining a second age at which the outstanding message tracker reaches the predetermined size.

* * * * *

UNITED STATES PATENT AND TRADEMARK OFFICE
CERTIFICATE OF CORRECTION

| | | |
|---|---|---|
| PATENT NO. | : 7,937,257 B2 | Page 1 of 1 |
| APPLICATION NO. | : 11/247976 | |
| DATED | : May 3, 2011 | |
| INVENTOR(S) | : Arora | |

It is certified that error appears in the above-identified patent and that said Letters Patent is hereby corrected as shown below:

References Cited

On page 2, in column 1, Under Other Publications, line 5, delete "synthesisBhatt," and insert -- synthesis Bhatt, --, therefor.

On page 2, in column 1, Under Other Publications, line 12, delete "Rashib," and insert -- Rashid, --, therefor.

In the Specification

In column 4, line 23, delete "spill/ and or" and insert -- spill and/or --, therefor.

In the Claims

In column 11, line 12, in claim 7, delete "arid" and insert -- and --, therefor.

Signed and Sealed this
Sixth Day of October, 2015

Michelle K. Lee
*Director of the United States Patent and Trademark Office*